United States Patent
Hericourt (10) Patent No.: US 6,779,032 B1
(45) Date of Patent: Aug. 17, 2004

(54) METHOD AND SYSTEM FOR OPTIMALLY SELECTING A TELNET 3270 SERVER IN A TCP/IP NETWORK

(75) Inventor: Olivier Hericourt, Cagnes-sur-Mer (FR)

(73) Assignee: International Business Machines Corporation, Armonk, NY (US)

( * ) Notice: Subject to any disclaimer, the term of this patent is extended or adjusted under 35 U.S.C. 154(b) by 800 days.

(21) Appl. No.: 09/604,594

(22) Filed: Jun. 27, 2000

(30) Foreign Application Priority Data

Jul. 1, 1999 (EP) .......................................... 99480055

(51) Int. Cl.⁷ .......................................... G06F 15/173
(52) U.S. Cl. ...................... 709/226; 709/203; 709/219; 709/227; 709/228; 709/229
(58) Field of Search ................................ 709/203, 219, 709/226, 227, 228, 229

(56) References Cited

U.S. PATENT DOCUMENTS

| | | | | |
|---|---|---|---|---|
| 5,459,837 A | * | 10/1995 | Caccavale ................... | 709/226 |
| 5,754,830 A | * | 5/1998 | Butts et al. ................. | 719/311 |
| 5,862,348 A | * | 1/1999 | Pedersen .................... | 709/229 |
| 5,951,694 A | * | 9/1999 | Choquier et al. ............. | 714/15 |
| 5,961,582 A | * | 10/1999 | Gaines ........................... | 709/1 |
| 5,974,409 A | * | 10/1999 | Sanu et al. .................... | 707/3 |
| 6,014,702 A | * | 1/2000 | King et al. ................. | 709/227 |
| 6,041,041 A | * | 3/2000 | Ramanathan et al. ....... | 370/241 |
| 6,049,833 A | * | 4/2000 | Chan et al. ................. | 709/237 |
| 6,067,580 A | * | 5/2000 | Aman et al. ................. | 709/330 |
| 6,119,162 A | * | 9/2000 | Li et al. ...................... | 709/227 |
| 6,122,276 A | * | 9/2000 | Boe et al. .................... | 370/389 |
| 6,128,662 A | * | 10/2000 | Bolton et al. ............... | 709/228 |
| 6,131,116 A | * | 10/2000 | Riggins et al. ............. | 709/219 |
| 6,233,541 B1 | * | 5/2001 | Butts et al. .................... | 703/27 |
| 6,233,542 B1 | * | 5/2001 | Butts et al. ................... | 703/27 |
| 6,233,543 B1 | * | 5/2001 | Butts et al. .................... | 703/27 |
| 6,263,361 B1 | * | 7/2001 | Hoyer et al. ................ | 709/203 |
| 6,353,608 B1 | * | 3/2002 | Cullers et al. .............. | 370/352 |
| 6,532,241 B1 | * | 3/2003 | Ferguson et al. ........... | 370/469 |

FOREIGN PATENT DOCUMENTS

EP            1045563 A1  *  10/2000

* cited by examiner

Primary Examiner—Nabil El-Hady
(74) Attorney, Agent, or Firm—Winstead Sechrest & Minick P.C.; John R. Pivnichny

(57) ABSTRACT

The present invention relates to dynamic configuration of Telnet 3270 Clients and more particularly to a method and system for optimizing selection of a Server according to some response time and availability criteria. The invention rests on an Intermediate Selection Application mechanism using Availability and Response Time Probes. The present invention comprises the steps of retrieving known SNA Application Welcome Screens from SNA Applications through each server, measuring associated response times, and detecting failures and degradation of response time. The present invention uses a CGI (Common Gateway Interface) program for dynamically creating a Selection Screen (a web page in HTML code in one embodiment) on an Intermediate Selection Application.

75 Claims, 8 Drawing Sheets

Data Flows Associated with the Availability and Response Time Probes

(PRIOR ART)

FIG. 1

(PRIOR ART)

FIG. 2

(PRIOR ART)

FIG. 3

(PRIOR ART)

FIG. 4

Data Flow Associated with the Availability and Response Time Probe Process

METHOD AND SYSTEM FOR OPTIMALLY SELECTING A TELNET 3270 SERVER IN A TCP/IP NETWORK

TECHNICAL FIELD OF THE INVENTION

The present invention relates to computer networks, and more particularly to a method and system in an Internet Protocol (IP) network for automatically and optimally selecting a Telecommunications Network ("Telnet") 3270 Server according to response time and availability criteria.

BACKGROUND

SNA and IP Environment

Every day, for all sorts of reasons, more and more companies are focusing on the consolidation of the multiple specialized networks they directly operate or lease from service providers onto a single protocol network. These multiple specialized networks are based on diverse networking technologies such as Systems Network Architecture (SNA), Internet Protocol (IP) or Internetwork Packet Exchange (IPX).

These companies are making this consolidation one of their top priorities. Companies are almost exclusively selecting the Internet Protocol (HP) as their protocol of choice. However, for the overwhelming majority of these companies using SNA protocols and applications, there still is and will be for the many years to come, a major requirement in this changing environment. The requirement is for the employees of these companies to keep the capability they always had to access the huge amount of existing corporate data residing in traditional mainframes and accessible through SNA applications.

TCP/IP

The Internet is a global network of computers and computers networks. The Internet connects computers that use a variety of different operating systems and languages, including UNIX, DOS, Windows, Macintosh, and others. To permit communication among these various systems and languages, the Internet uses a standard language referred to as TCP/IP ("Transmission Control Protocol/InternetProtocol"). The TCP/IP protocol supports three basic applications on the Internet: transmitting and receiving electronic mail, logging into remote computers ("Telecommunications Network" or "Telnet"), and transferring files and programs from one computer to another ("FTP" or "File Transfer Protocol").

World Wide Web

With the increasing size and complexity of the Internet, tools, often called navigators or navigation systems, have been developed to help find information on the network. Navigation systems that have been developed include programs such as Archie, Gopher and WAIS. The World Wide Web ("WWW" or "the Web") is a recent superior navigation system. The Web is:

an Internet-based navigation system, an information distribution and management system, and a dynamic format for communication.

The Web seamlessly integrates several forms of information, including still images, text, audio and video. A user on the Web using a Graphical User Interface ("GUI", pronounced "gooey") may transparently communicate with different host computers on the Internet different system applications (including FTP and Telnet), and different information formats for files and documents including, for example, text, sound and graphics.

Hypermedia

The Web uses hypertext and hypermedia. Hypertext is a subset of hypermedia and refers to computer-based "links" through which uses move from one place to another in a document, or to another document, in a non-linear manner. To accomplish this feature, the Web uses a client-server architecture. The user's computer is said to be a client computer to the Web server computer. Web servers enable a user to access hypertext and hypermedia. The clients send requests to the Web servers, which in turn react, search and respond. The Web allows client-based application softwares to request and receive hypermedia documents (including formatted text, audio, video and graphics) from a Web file server with hypertext link capabilities to other hypermedia documents.

The Web, then, can be viewed as a collection of document files residing on Web host computers that are interconnected by hyperlinks using networking protocols, forming a virtual "web" that spans the Internet.

Uniform Resource Locators

A resource on the Internet may be unambiguously identified by a Uniform Resource Locator (URL), which is a pointer to a particular resource at a particular location. A URL specifies the protocol used to access a server (e.g. http://, ftp://, etc.), the name of the server (e.g. www.ibm.com, and the location of a file on that server (e.g./products/catalog.html).

HyperText Transfer Protocol (HTTP)

Each Web page may appear as a complex document that integrates many media, for example, text, images, sounds and animation. Each such page may also contain hyperlinks to other Web documents, so that a user at a client computer may click on icons using a mouse and may activate hyperlink jumps to a new page (which is a graphical representation of another document file) on the same or a different Web server.

A Web Server is a software program run on a Web host computer that responds to requests from Web Clients, typically over the Internet. All Web servers use a language or protocol to communicate with Web Clients which is called HyperText Transfer Protocol ("HTTP") graphics, sound and video. All types of data, including HyperText Markup Language("HTML"), can be exchanged among Web servers and clients using this protocol. HTML describes the layout, contents and hyperlinks of the documents and pages to be displayed to the user. When browsing, Web Clients convert user-specified commands into HTTP GET requests, connect to the appropriate Web Server to obtain the information, and await a response. The response from the server may be the requested document or an error message. After a document or an error message is returned, the connection between the Web client and the Web server is closed.

The first version of HTTP is a stateless protocol. That is to say, with HTTP version 1.0, there are no continuous connections between clients and servers. A Web client using HTTP receives a response as HTML data or other data. Newer versions of HTTP break this barrier of a stateless protocol by keeping the connection between the server and client alive under certain conditions.

Browser

After receipt, the Web Client formats and presents the data or activates an ancillary application, such as a sound player, to present the data. To do this, the server or the client first determines the type of data to be received. The Web Client is also referred to as the "Web Browser," since it in fact browses documents retrieved from the Web Servers.

Telnet 3270

A widely used technique for the transport of SNA information across an IP network is the use of Telnet technologies, specifically the Telnet 3270 ("TN3270") emulation. This technique for SNA "green screen" workstation users utilizes a Client/Serverapproach. "Host-On Demand" from IBM or "WebClient" from CISCO are examples of Client software implementations. Network Utility from IBM or CISCO router's offerings are typical server implementations (hardware and software). The "TN3270 Client" software usually runs within the customer's workstation while the "TN3270 Server" software is usually placed in front of the customer's data center mainframes (or sometimes directly within the mainframe itself) or within the customer's branch offices.

Figure 1:
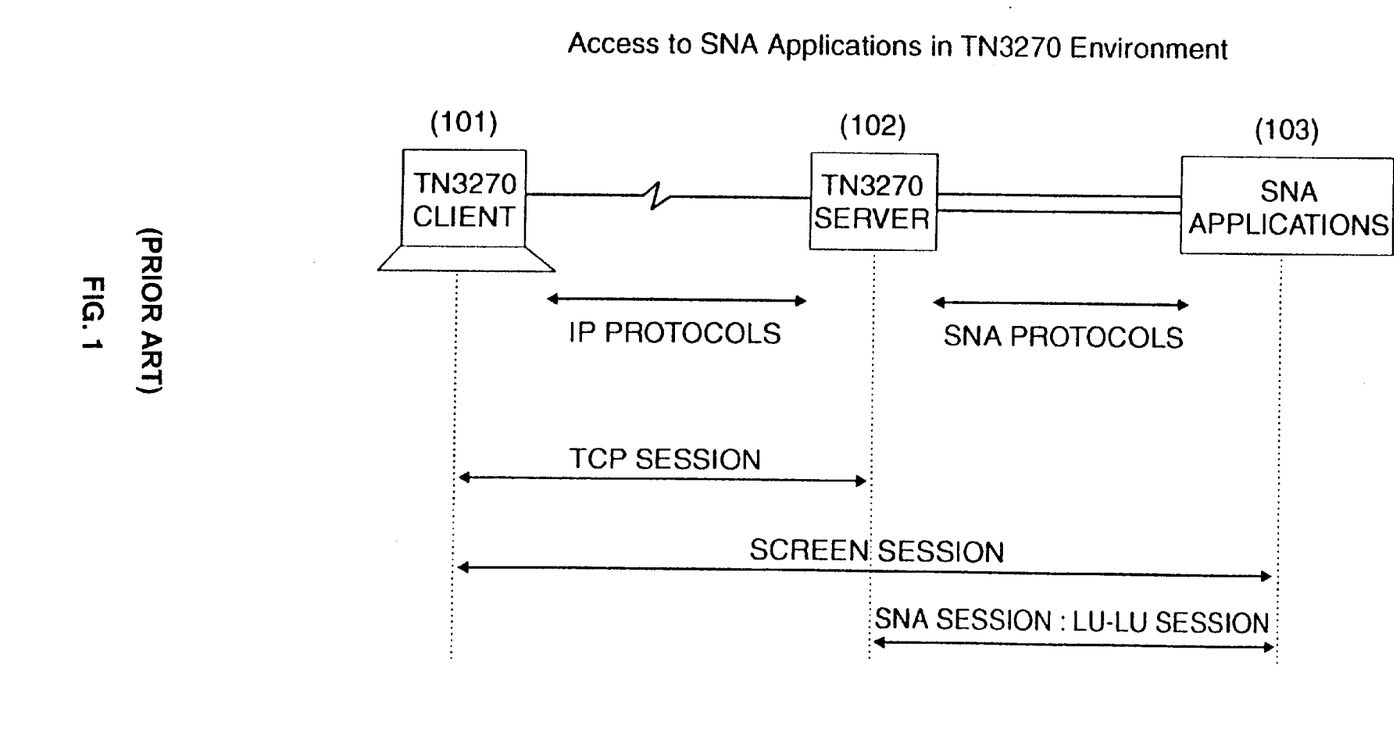
FIG. 1 is a general logical view of a Client accessing SNA Applications in a TN3270 environment, according to the prior art.

As illustrated in FIG. 1, IP protocols are used between the TN3270 Server 102 and the TN3270 Clients 101, while traditional SNA protocols are used between the TN3270 Server 102 and the target SNA applications 103. More information concerning Telnet, TN3270 and Network Utility can be found in the following publications, incorporated herewith by reference:
"TCP/IP Tutorial and Technical Overview," Martin W. Murhammer, Orcun Atakan, Stefan Bretz, Larry R. Pugh, Kazunari Suzuki, David H. Wood, IBM International Technical Support Organization, October 1998, GG24-3376-05.
"IBM 2216/Network Utility Host Channel Connection," Erol Lengerli, Jacinta Carbonell, Thomas Grueter; IBM International Technical Support Organization, January 1999, SG24-5303-00.
"IBM Network Utility Description and Configuration Scenarios," Tim Kearby, Peter Gayek, Gallus Schlegel, Imre Szabo, Zhi-Yong Zhang; IBM International Technical Support Organization, January 1999, SG24-5289-00.
"Internetworking with TCP/IP-Volume I-Principles, Protocols, and Architecture," Douglas E. Comer, Second Edition, Prentice Hall 1991.
Requests For Comments (RFCs) from the Internet Engineering Task Force (IETF):
RFC 1576: TN3270 Current Practices,
RFC 1646: TN3270 Extensions for LU name and Printer Selection,
RFC 1647: TN3270 Enhancements, and RFC 2355: TN3270 Enhancements.

Accessing SNA Application via Traditional SNA End-to-End

Figure 2:
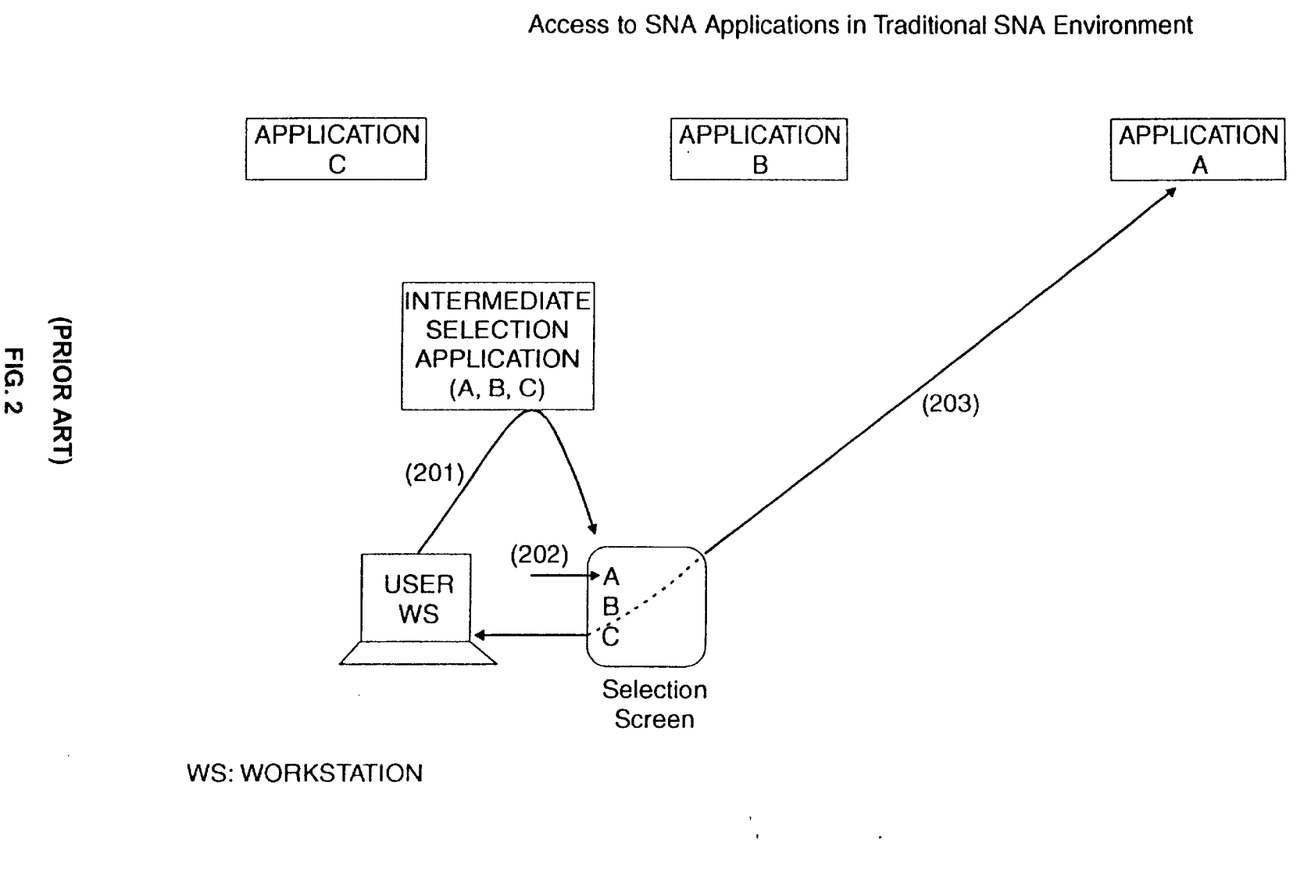
FIG. 2 is a logical view of a system for having access to SNA Applications via an Intermediate Selection Application in a traditional SNA environment, according to the prior art.

In the traditional SNA world, user workstations traditionally obtain access to SNA applications by connecting first to an intermediate application. This intermediate application provides for access to the real target application. This intermediate application, also referred to as an Intermediate Selection Application, usually displays to the user a selection screen which lists the SNA applications that may be accessed. The user selects from that menu the target SNA application he wants to access and is then connected to that target SNA application, which usually presents to the user an application welcome screen (for instance displaying the SNA-application name and asking for a user logon and password). FIG. 2 describes a traditional SNA access to an Intermediate Selection Application in an SNA environment.

First step 201: The user is presented a Selection Screen of a plurality of possible applications by the Intermediate Selection Application (three possible applications A, B and C). Usually, the workstation automatically sets up a direct connection to the Intermediate Selection Application, as soon as the workstation's SNA protocol stack is started (or, in case of a "dumb" terminal, when the terminal is powered on). Second step 202: Provided that at this time the Intermediate Selection Application is up and running, the connected user selects an application (application A) by typing an application name on the selection screen. Third step 203: Finally, the user is connected to the desired application (application A), which usually presents to the user an application welcome screen.

Accessing SNA Application from TN3270 Client with Manual Configuration

TN3270 Clients can be manually configured with the IP address or name of the TN3270 Server which needs to be accessed to reach the target SNA application. The main drawback to this setup is that the TN3270 Server selection is then static. There is no dynamic criteria for selecting the TN3270 Server, such as the response time. TN3270 Server failures require manual reconfiguration of the TN3270 Clients to point to an alternate active TN3270 Server, since manual configuration usually allows the definition of only a single TN3270 Server and no ability to define a backup TN3270 Server configuration.

Accessing SNA Application from TN3270 Client with Dynamic Configuration

Figure 3:
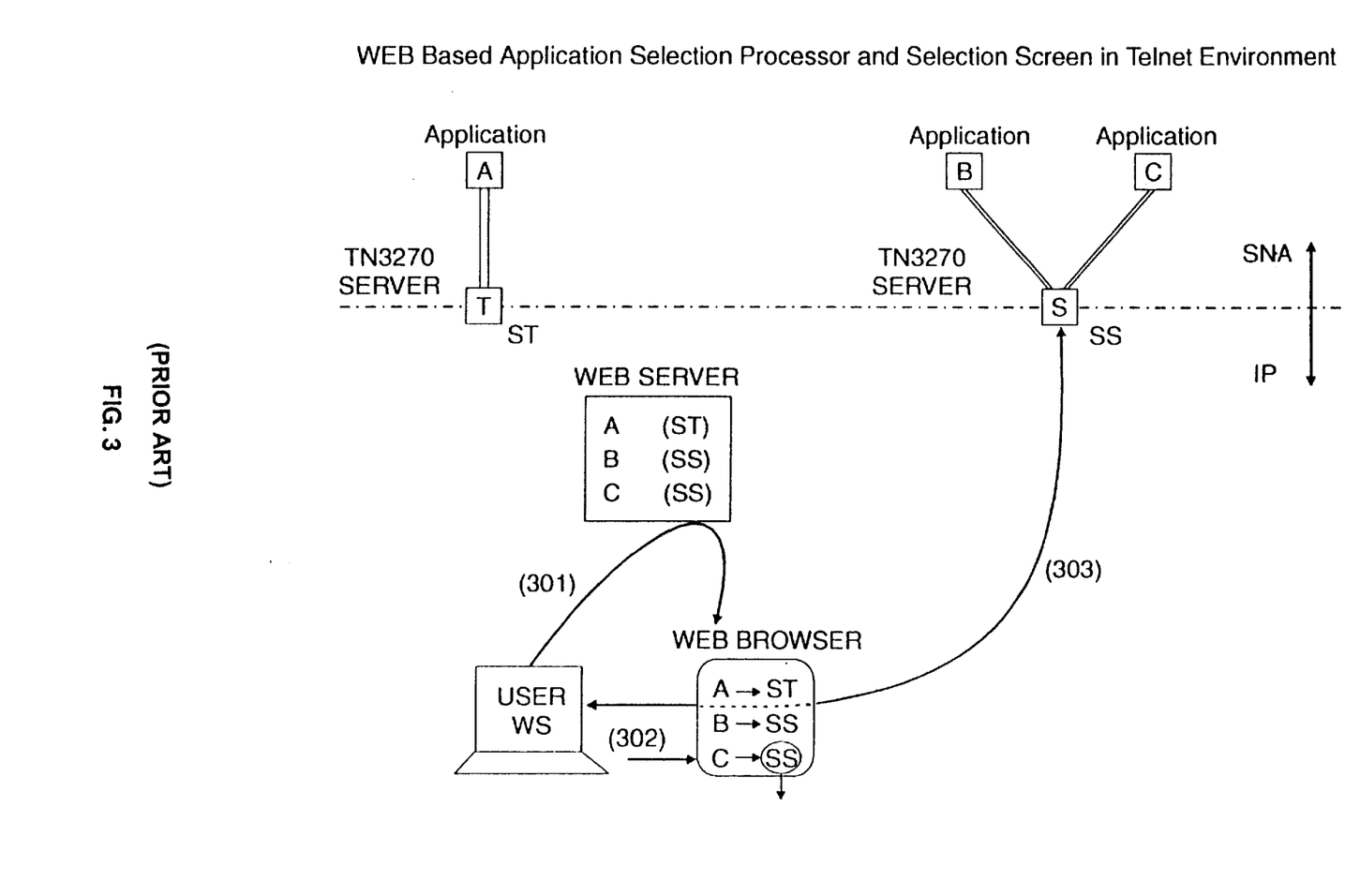
FIG. 3 is a logical view of a Web based Intermediate Selection Application for accessing SNA Applications in a TN3270 environment according to the prior art.

In a TN3270 Client-Server approach, one technique commonly applied is to provide the Intermediate Selection Application via a Web Server implementation. In such a case, the user accesses the Intermediate Selection Application within the Web Server, using his favorite Web Browser running on his user workstation. This approach is described in FIG. 3:

First step 301: The user receives a Selection Screen on the Web Browser from the Intermediate Selection Application in the Web Server. The selection screen may offer three applications: A, B and C. By selecting the desired SNA Application from the Selection Screen (just a click from within the Browser), the workstation obtains the IP addressing/naming information corresponding to the preferred TN3270 Server for the desired target SNA application.

Second step 302: If the user chooses application C from the Selection Screen, the user workstation obtains from the Web Server the address (SS) for the TN3270 Server(s) (providing access to the mainframe housing application C).

Third step 303: Thus, the local TN3270 Client can then be started either manually or automatically to access the preferred Telnet server by using the address provided by the Intermediate Selection Application. The user workstation receives back the address of the Telnet server (Server S which address is SS) and connects to the target application C via the appropriate Server (Telnet Server S). The target application C then presents an Application Welcome Screen to the user (for instance displaying the SNA application name and asking for a user logon and password).

Going through an Intermediate Selection Application shields end-users from changes that inevitably occur, for example, when an SNA application is changed to be run from one Host to another Host in a different location, or when a new SNA application is added. In such cases, only the Selection Screen need be modified. Changes in target application locations are completely transparent to the workstations. Another advantage is that a user's connection to a single intermediate application (the Intermediate Selection Application) provides a single access point to the many possible SNA applications, wherever they are located.

The use of an intermediate, menu-driven Intermediate Selection Application greatly simplifies the task of the workstation users who may automatically obtain access through a user-friendly, menu-driven, application selection menu (the Selection Screen). The users need not be concerned by manual definitions that need to be performed and maintained over system changes.

Problem

The problem is to provide a system and method for automatically configuring the TN3270 Client to use the best TN3270 Server to access the desired SNA Application. Current solutions address the problem of configuring the TN3270 client only partially. TN3270 Clients can be manually configured with the target TN3270 Server. The main drawbacks of this solution are as follows:

(a) There is no dynamic TN3270 Server selection, (b) When the TN3270 Server is in failure, a manual reconfiguration of the TN3270 Client is required; and (c) TN3270 Server names or addresses must be known and manually configured by end users for each SNA Application the user wants to access.

(d) Only a "manual" load balancing through the static configuration of the TN3270 Clients is provided.

TN3270 Clients can also be dynamically configured for a target TN3270 Server corresponding to the desired SNA Application using an Intermediate Selection Application running on a dedicated Web Server. The main drawbacks concerning this solution are as follows:

(a) There is no response time consideration in the TN3270 Server selection;

(b) There is no efficient TN3270 Server failure detection (i.e. to access a particular SNA application, the Web Server will always select the same TN3270 Server to the end users, even if that Server has failed);

(c) The connection to the SNA Application is indirect, since the end user has to first manually connect to a Web Server to receive the Selection Screen. This Web Server connection terminates each time the end user wants to access an SNA Application, even if the Intermediate Selection Application is able to determine the best TN3270 Servers and is able to detect TN3270 Server failures.

An alternate solution is to cluster the TN3270 Servers using an external dispatcher system acting as single logical access point. All TN3270 Clients are then manually configured with the name of that external dispatcher system (as the target TN3270 Server) which then routes the traffic to selected TN3270 Servers. An example of such a dispatcher is the IBM Interactive Network Dispatcher product. More information concerning this product can be found in IBM's publication entitled "Interactive Network Dispatcher v1.2-User's Guide" GC31-8496-01 incorporated herewith by reference.

Although a dispatcher oriented solution allows an efficient load balancing in most cases, the problems with this solution are as follows:

(a) An additional dedicated system or a specific hardware is required;

(b) An additional software layer resides between the end users and the SNA Applications (hence potential degradation on performance); and (c) The external dispatcher name must be manually configured by end users in the TN3270 Clients.

The present invention optimizes TN3270 Server selection by using availability and response time criteria. The present invention also to optimizes TN3270 service performance by integrating a response time factor to the TN3270 Server selection. The present invention minimizes TN3270 service application interruption and thus insures better service availability by automatically detecting failures on TN3270 Servers.

SUMMARY OF THE INVENTION

The present invention relates to the dynamic configuration of Telnet 3270 Clients and more particularly to a method and system for optimizing selection of a Telnet 3270 Server according to some response time and availability criteria. The invention comprises an Intermediate Selection Application mechanism which uses availability and response time probes.

The present invention comprises the steps of retrieving known SNA Application Welcome Screens from SNA Applications through a Server, measuring the associated response time, and detecting failures and degradation of response time. The present invention can also use a CGI (Common Gateway Interface) program for dynamically creating a Selection Screen (which may be a web page in HTML code) on an Intermediate Selection Application.

The present invention addresses the drawbacks of the existing current solutions by integrating dynamic server availability and response time selection criteria to an Intermediate Selection Application system. The present inventions provides the following advantages:

(a) Early detection of failures on Servers resulting in a high service availability;

(b) Integration of a response time factor to the Server selection process optimizes performances of the Server;

(c) Induced IP (Internet Protocol) and SNA (Systems Network Architecture) survey traffic is minimized by running availability and response time probes from a single Intermediate Selection Application URL system (as opposed to running the probes on each Client system);

(d) Integration of response time degradation in the probes achieves a proactive Server failure detection;

(e) A periodic dynamic update of optimal or "best" Servers can be provided to Clients;

(f) Useless traffic to failing Servers is minimized since failed Telnet 3270 Servers are excluded from list of available target servers upon failure detection;

(g) No additional or specific hardware is required; and (h) Client performances are not degraded because availability and response time probes are not processed within the downloaded Selection Screen but in the Intermediate Selection Application URL system.

DRAWINGS

The novel and inventive features believed characteristics of the invention are set forth in the appended claims. The invention itself, however, will best be understood by reference to the following detailed description of an illustrative detailed embodiment when read in conjunction with the accompanying drawings, wherein

DETAILED DESCRIPTION OF THE INVENTION

SNA and IP ENVIRONMENTS

Extension of networks

To remain competitive, network users are extending their traditional internal SNA and IP networks outward to business partners, dealers, suppliers, and customers. In this expanding environment, users are also searching for ways to save money and provide connectivity between their mix of SNA and TCP/IP server applications and their TCP/IP and SNA desktop client population. Consolidation of Networks Many companies today are considering the consolidation of their WAN traffic onto a single IP-only backbone. At the same time, other companies are simplifying their workstation configurations and attempting to run only the TCP/IP protocol stack at the desktop. However, most of these companies still require access to SNA applications hosts.
Telnet 3270

TN3270 meets these requirements by allowing the end user to run IP from the desktop over the network and attach to an SNA host through a TN3270 server. The clients connect to the server using a TCP/IP connection. The server provides a gateway function for the downstream TN3270 Clients by mapping the client sessions to SNA-dependent logical-unit-to-logical-unit ("LU-LU") sessions that the server maintains with the SNA host. The TN3270 server handles the conversion between the TN3270 data stream and an SNA data stream.

As mentioned above, the path from a TN3270 client to the SNA host consists of:

(a) A TCP connection over IP from the client to the server; and (b) An SNA LU-LU session from the server to the host.

A connection to a host for establishing an LU-LU session can be accomplished using a traditional subarea connection or using an Advanced Peer-to-Peer Network ("APPN") connection.

To deploy a TN3270 solution, TN3270 client software is installed on desktop workstations and TN3270 server software is installed in one of several places discussed below. Client software is available from IBM and many other vendors, and runs on top of the TCP/IP stack in the workstation. A given client product may provide one of two possible levels of standard support:

(a) Base TN3270 client. These clients conform to RFC 1576 (TN3270 Current Practices);

(b) TN3270 client. These clients conform to RFC 1646 (TN3270 Extensions for LU Name and Printer Selection); and/or (c) TN3270 client. These clients conform to RFC 1647 (TN3270 Enhancements) and RFC 2355 (TN3270 Enhancements).

Figure 4:
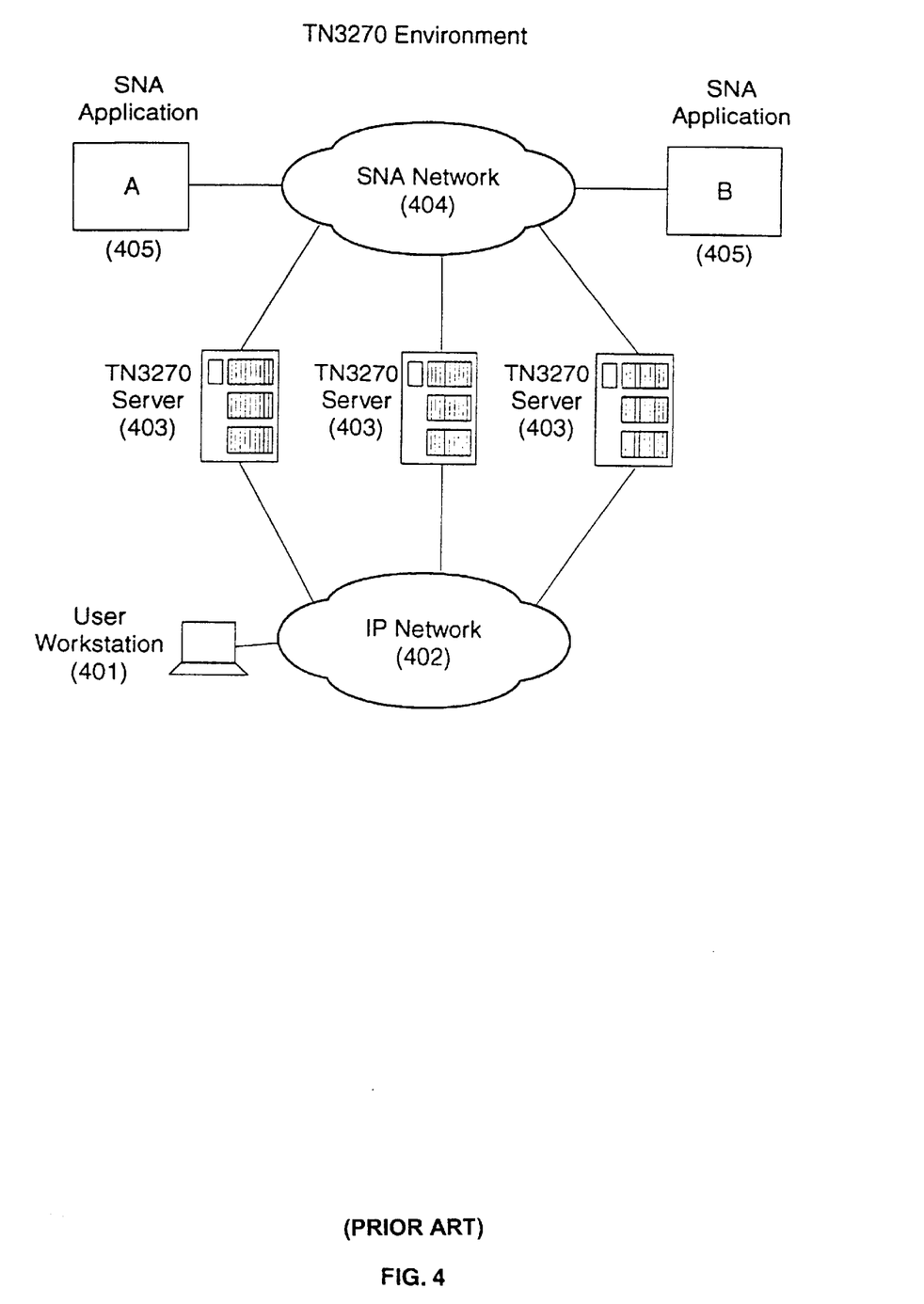
FIG. 4 is a physical view of the TN3270 environment described in FIG. 3.

A server implementation that can support TN3270E clients is called a TN3270E server. The TN3270 server function can be placed in a variety of products and positions within a network, including within the SNA host itself, in a router in front of the data host, or within the network or in a specialized box within the network.
Access of SNA Applications via Telnet 3270 Servers FIG. 4 shows an end user workstation 401 accessing SNA Applications 405 via TN3270 Servers 403. The end user workstation 401 hosts a Web Browser and a TN3270 Client and is connected to the IP network 402. The TN3270 Servers 403 attach to both the IP network 402 and the SNA network 404. They act as an intermediary or interface for the communications between the IP network 402 and the SNA network 404. The systems hosting the destination SNA Applications 405 also connect to the SNA Network.

Multiple TN3270 Servers may be used to access the same SNA Application in order to provide some degree of access robustness and load balancing.
Availability and Response Time Probes
Physical View The field of the invention is described with reference to FIG. 4, where an end user within a IP network wants to access through a plurality of Servers one or a plurality of SNA Applications. The problem is to select the "best" (most appropriate) Server to insure to the end user an optimized availability and response time of the TN3270 service.

Figure 5:
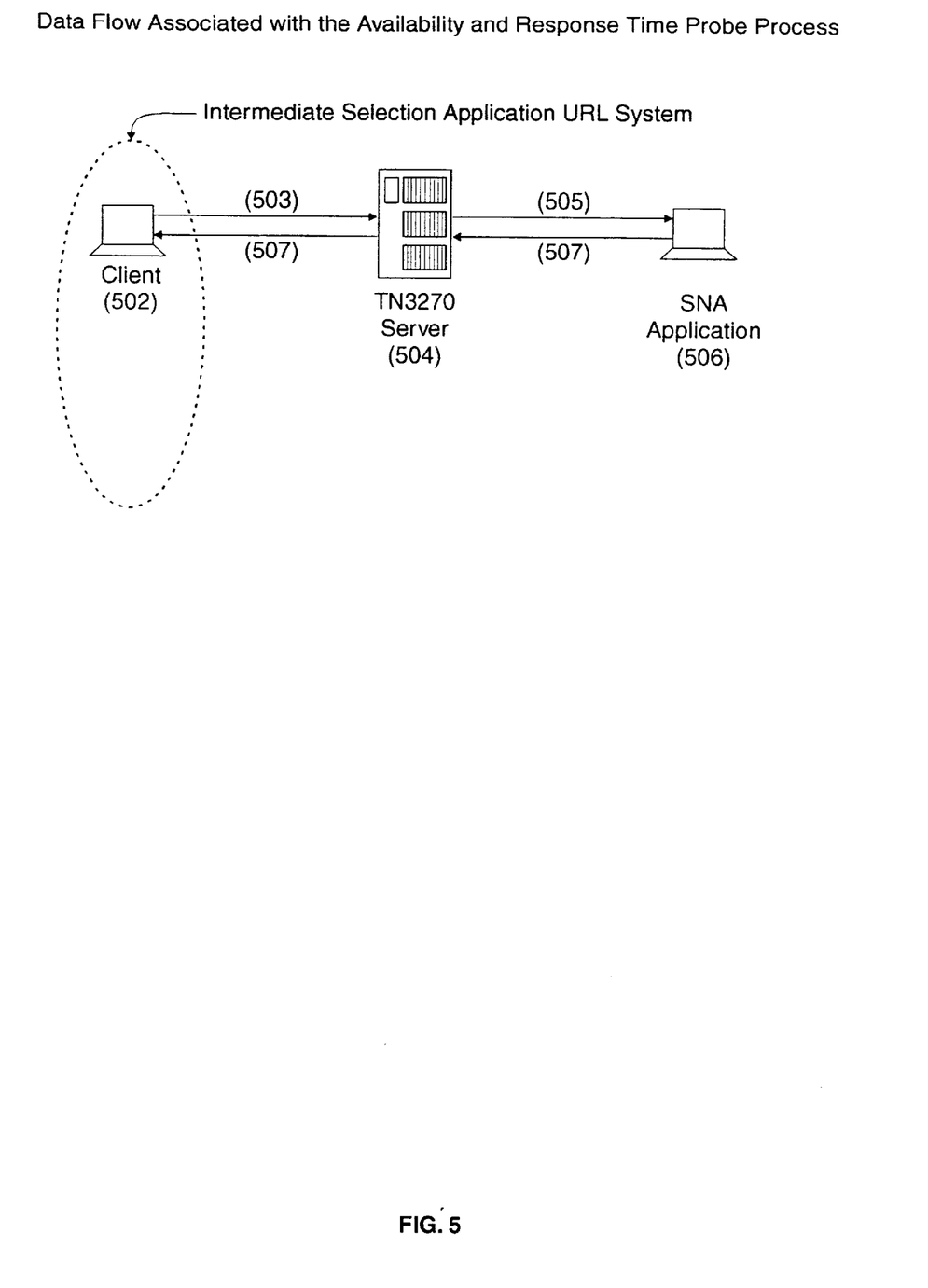
FIG. 5 is a physical view of the data flow associated with an availability and response time probe according to the present invention.

To automatically optimize the Server selection, a software component called a "TN3270 Availability and Response Time Probe" is introduced. Its role is to provide selection criteria. As shown in FIG. 5, the response time for requesting a connection to an SNA Application through a particular Client is measured by means of probes. To minimize the induced IP and SNA survey traffic, Availability and Response Time Probes are processed from a single Intermediate Selection Application URL system (versus processing the Availability and Response Time Probes from each Client).

FIG. 5 shows the way an availability and response time probe can be used to gather information concerning the availability and response time of TN3270 Servers. The Client 502 in the Intermediate Selection Application URL system 501 (configured to test TN3270 Servers) requests 503 a connection to an SNA Application 506 via a TN3270 Server 504. This process is similar to the general process shown in FIG. 1.

The Server 504 forwards 505 the request for connection to the SNA Application 506. When the connection is established, the SNA Application 506 sends an Application Welcome Screen 507 to the Client 502. The Client 502 in the Intermediate Selection Application URL system 501 times how long the request/response survey flow takes to establish the connection and to receive the Application Welcome Screen and uses this information as measurement of the availability and response time of the tested TN3270 Server. Since the Client 502 is running on the Intermediate Selection Application URL system 501, the measurement information gathered for each TN3270 Server can be used to select the "best" Server for accessing the target SNA Application.

The same process can be used for each SNA Application the end user wants to access, in order to determine a "best" Server for each of the SNA Applications offered. The result can then be encoded in the Selection Screen that the Web Browser uses to determine which Server will be used.

If there is no response to the connection request, then that particular Server can be considered as unavailable. In this way the Selection Screen created by the Intermediate Selection Application URL system can be used to filter out Servers that do not work.

Logical View

Figure 6:
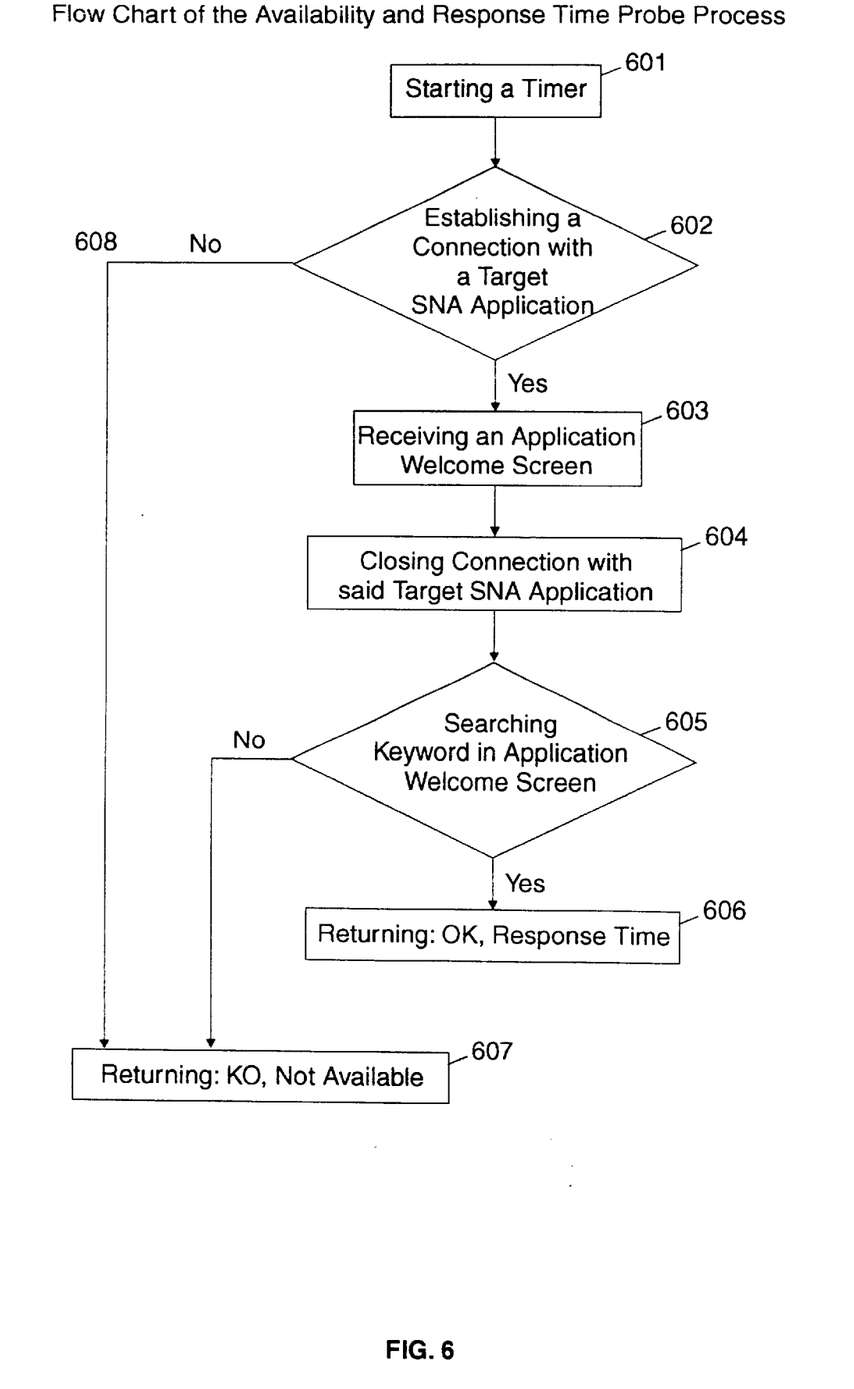
FIG. 6 is a flowchart of the process of using availability and response time probes according the present invention.

FIG. 6 is a flow chart of the process using Availability and Response Time Probes. The Probe simulates a Client by requesting a connection to an SNA application through a target Server (using its host name and port as a reference). Once the connection is successfully established, an Application Welcome Screen is sent by the host processing the SNA Application to the Client. The Probe mechanism in the Intermediate Selection Application checks that the Application Welcome Screen is received within an allowed amount of time in seconds and contains a specific keyword, or multiple specific keywords, to make sure that the received Application Welcome Screen is correct. When these two conditions are fulfilled, the connection to the host processing the SNA Application is considered successful. Finally, an associated response time in seconds (successful retrieval) or a failure return code is returned and stored in a table within the Intermediate Selection Application URL system.

Connections can be established to one or multiple target SNA Applications. When multiple SNA Applications are tested, each SNA Application is sequentially tested until one connection is successful or all connections fail.

In summary, the Probe mechanism connects to known SNA applications through each Server, measures associated response time, detects Servers in failure, and monitors the degradation of the response time. FIG. 6 is a flow chart showing the internal logic flow of the TN3270 Availability and Response Time Probe introduced in FIG. 5.

First, the probe program starts 601 a timer. Next the probe program attempts 602 to establish a connection with the system hosting the target SNA Application. The Probe program establishes 608 the connection via a TN3270 Server (e.g. the Server name is provided to the Probe program as input parameter). If the attempt to establish the connection is unsuccessful, the probe program immediately enters an error mode. An error value is returned 607 by the probe program indicating that the connection with the system hosting the SNA application is not possible 603. If the attempt to establish the connection is successful, then an Application Welcome Screen sent by SNA Application is received 604 by the probe program. The probe program then closes 605 the connection according to the normal TN3270 procedure.

To ensure that the Application Welcome Screen has been correctly retrieved, the Probe program then searches 606 for a known keyword in the Application Welcome Screen. If the keyword is found in the Application Welcome Screen, then the session is successful. The timer is stopped and the response time for the operation is returned. By storing and integrating a historic record of the measured response time over time, the Probe program can detect 607 any response time degradation, and thus anticipate failures on TN3270 Servers.

If, however, the correct keyword is not found in the Application Welcome Screen, then the connection with the SNA application is unsuccessful and again an error value is returned. The type of event that might trigger this kind of error is when the connection is successfully established with the system hosting the SNA Application, but an Application Welcome Screen containing an error is retrieved. The probe may go into a retry mode occurs when the probe program is configured to attempt multiple destination SNA Applications, as opposed to a single SNA Application. This retry mode adds robustness to the testing of the TN3820 connection and hence insulates it somewhat from one-time off-network "glitches" (e.g., dropped connections etc.).

Data Flows

Figure 7:
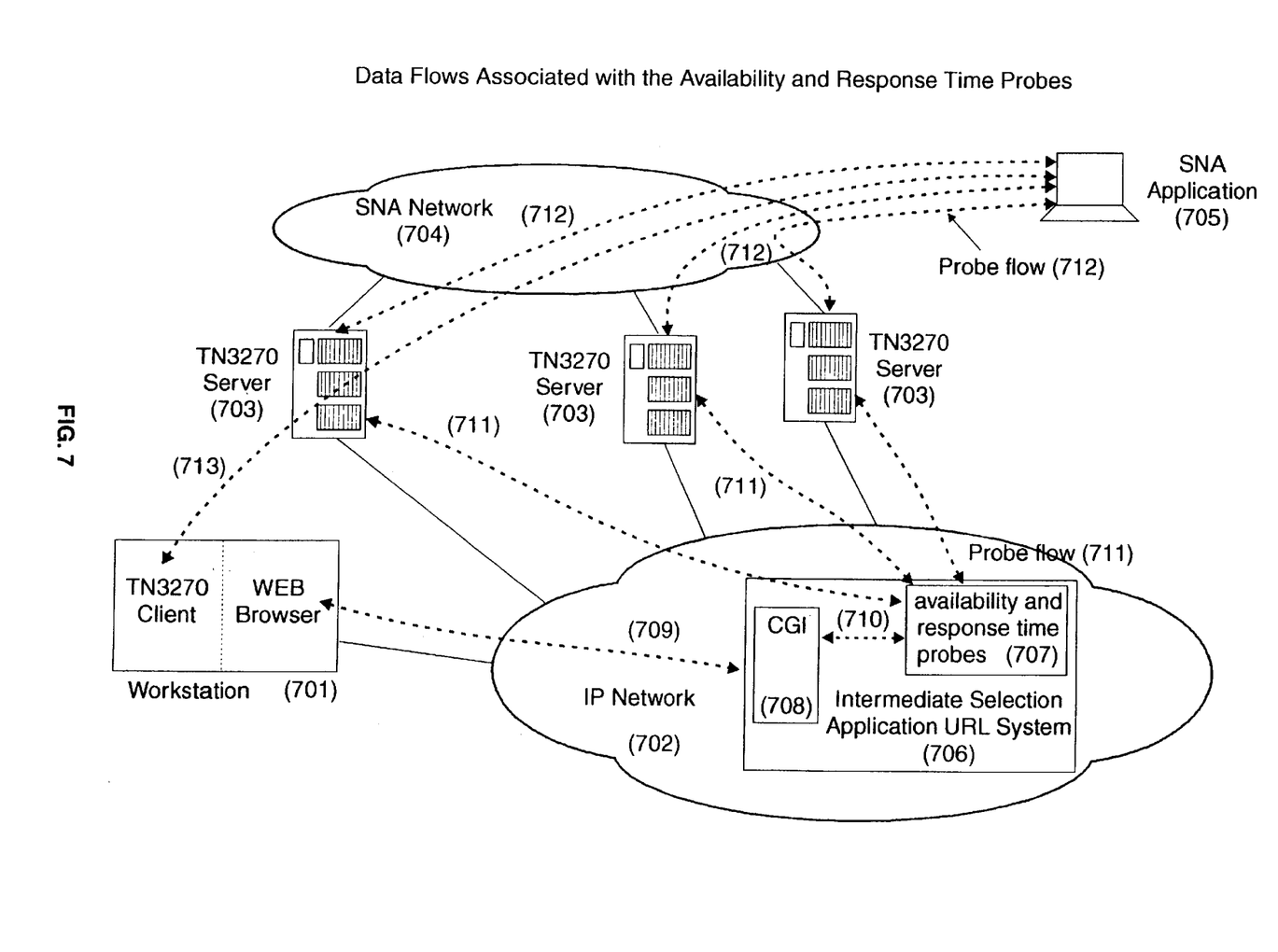
FIG. 7 is a general view of data flows associated with the availability and response time probes according to the present invention.

As shown in FIG. 7, Probes are used by various components and in various flows in order to provide TN3270 Clients with the best TN3270 Server.

Intermediate Selection Application

The information gathered by the Probes is indirectly downloaded to the Clients by using an Intermediate Selection Application running on a Web Server. The present invention permits a software implementation of Availability and Response Time Probes with no additional or specific hardware.

The information gathered by the Probe is stored on the Intermediate Selection Application URL system and is used to create the Selection Screen (created in HTML code in one embodiment). There need be no extra process inside the code of the Selection Screen. End user workstation performances are not degraded because Availability and Response Time Probes are not processed within the downloaded Selection Screen but in the Intermediate Selection Application URL system.

Common Gateway Interface

A CGI (Common Gateway Interface) program may dynamically create the Selection Screen with the availability and response time information provided by Probes. The use of response time and availability criteria for selecting a Server by the Probes is fully compatible, and can be combined, with existing criteria such as clients origin IP subnet. The use of response time and availability criteria also provides a proactive Server failure detection method through the integration of response time degradation evaluation.

Another positive consequence of the present invention is the minimization of useless traffic to failing TN3270 Servers since these Servers are excluded from list of available target Servers upon failure detection. Since an Intermediate Selection Application mechanism is used, there is no need to manually update the Client configuration in case of Server failure. Additionally, Server names and/or locations do not need to be known or configured by the end user. This feature provides a transparent service for mobile users.

FIG. 7 is a physical view of the logical environment described in FIG. 5. FIG. 7 shows the different data flows associated with the different physical entities. The system hosting the SNA Application 705 is attached to the SNA network 704, while the end user workstation 701 is attached to the IP network 702. The end user workstation 701 hosts a Web Browser and a TN3270 Client.

The end user first uses the Web Browser on his workstation 701 to connect to the URL of the Web Server system where the Intermediate Selection Application 706 resides in order to retrieve 709 the Selection Screen. The Intermediate Selection Application 706 also processes the Availability and Response Time Probes 707 configured to test the access to the SNA Applications 705 via the TN3270 Servers 703. The Intermediate Selection Application uses the CGI (Common Gateway Interface) 708 to dynamically create the Selection Screen web page. The Selection Screen web page is dynamically created 710 using information gathered by the availability and response time probes that have tested the Servers via the Probe flows 711, 712. The Selection Screen associates each SNA Application that can be accessed by the end users with an available Server which is deemed the best TN3270 Server for that SNA Application. The Selection Screen may then be received by the Web Browser via a normal HTTP flow 709.

The end user selects from the Selection Screen the target SNA Application desired. The Client can then be started with the appropriate TN3270 Server reference to access 713 the target SNA Application. In this way the TN3270 Client is configured with an available TN3270 Server and the selected TN3270 Server is more likely to be the best Server to access the selected SNA Application.

Internal Storage

The information gathered by the Availability and Response Times Probes is stored within the Intermediate Selection Application URL system. Each Probe updates a table in the Intermediate Selection Application URL system with the measurements of each Server it tests. The table contains the current state of all Servers that are candidates to be selected and used by the Clients. At programmable or periodical time intervals, Probes again test the Servers, update the table, and the process is repeated.

Intermediate Selection Application

Figure 8:
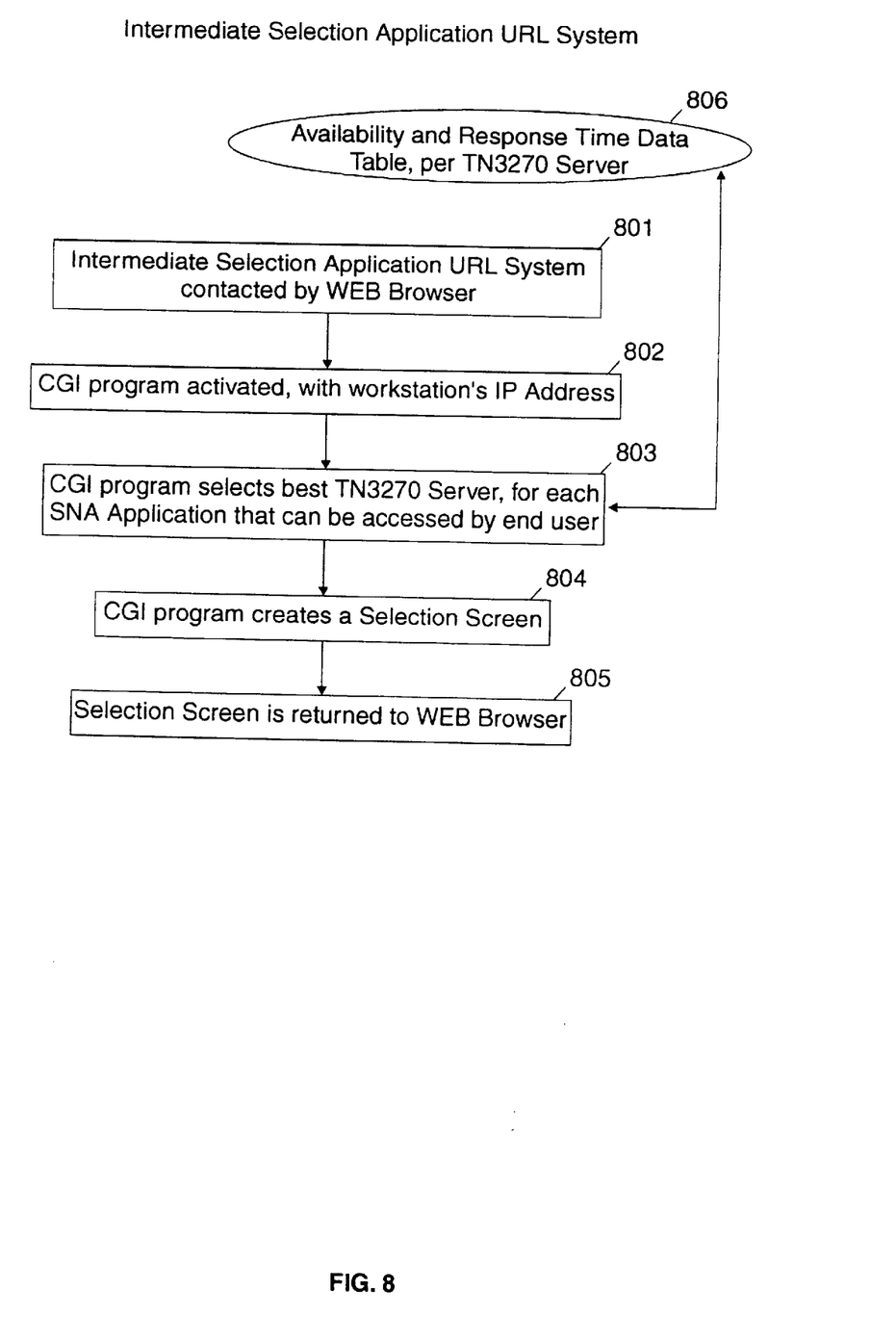
FIG. 8 is a flow chart of the program running on the Intermediate Selection Application URL (Uniform ResourceLocator) system according to the present invention.

FIG. 8 depicts the internal logic of the program running on the Intermediate Selection Application URL system. The Intermediate Selection Application URL system 801 is initially contacted by a Web Browser to download a Selection Screen to provide the best TN3270 Server to use for each SNA application. The Intermediate Selection Application activates 802 the CGI (Common Gateway Interface) program. The CGI program has access to all standard CGI variables including the Internet Protocol ("IP") address of the end user workstation where the Web Browser is running.

The CGI program selects 803 the best Server for each SNA Application based on both the IP address of the end user workstation (obtained as a CGI variable) and the information generated by the Availability and Response Time Probes for each Server, as stored in the table of the Intermediate Selection Application URL system 806. The IP address is used to add a geographical criteria to the Server selection process. For instance, if two TN3270 Servers provide the same response time (one in the US, the other one in Europe), the closest Server is preferred (the one in Europe if the end user workstation is located in Europe).

Once the CGI program has selected the best TN3270 Servers, it creates 804 a Selection Screen web page. This Selection Screen may be written in HTML. Once the Selection Screen web page has been created, the Intermediate Selection Application URL system downloads 805 the Selection Screen web page to the web Browser via standard HTTP as any other output of the CGI program.

While the invention has been particularly shown and described with reference to a preferred embodiment, it will be understood that various changes in form and detail may be made therein without departing from the spirit, and scope of the invention.

What is claimed is:

1. A method of dynamically selecting a Server for accessing Systems Network Architecture (SNA) Applications from a Client, in an Internet Protocol (IP) network comprising the steps of:

measuring performance and availability of each Server for accessing one or a plurality of SNA Applications using measurement probes; and dynamically selecting a Server for accessing a particular SNA Application using the performance and availability measurements.

2. The method according to claim 1 wherein:

the Server is a TN3270 Server; and the Client is a TN 3270 Client.

3. The method according to claim 1 wherein the step of measuring the performance and availability comprises the step of measuring the response time required to retrieve information from each SNA Application through each Server.

4. The method according to claim 3 wherein the information retrieved is a Welcome Screen.

5. The method according to claim 3 wherein the step of measuring the response time comprises the steps of:

establishing a connection with the SNA Application through the Server;

retrieving the information from the SNA Application; and checking that the retrieved information contains one or a plurality of known keywords.

6. The method according to claim 5 wherein the step of measuring the performance and availability further comprises the steps of:

comparing the measured response time for each server with response times previously measured; and determining for each server a degradation of the measured response time.

7. The method according to claim 5 wherein the step of measuring the performance and availability further comprises the steps of:

detecting failures on each server; and excluding servers in failure from consideration in the step of dynamically selecting a server.

8. The method according to claim 7 wherein the step of detecting a failure on a server comprises the steps of:

comparing the measured response time with a given threshold; and when said measured response time exceeds said given threshold, flagging the server as being in failure.

9. The method according to claim 5 wherein the step of selecting a server according to performance and availability measurements further comprises the step of selecting the Server according to the Client Internet Protocol (IP) address.

10. The method according to claim 3 wherein the step of measuring the performance and availability further comprises the steps of:

detecting failures on each server; and excluding servers in failure from consideration in the step of dynamically selecting a server.

11. The method according to claim 10 wherein the step of detecting a failure on a server comprises the steps of:

comparing the measured response time with a given threshold; and when said measured response time exceeds said given threshold, flagging the server as being in failure.

12. The method according to claim 3 wherein the step of selecting a server according to performance and availability measurements further comprises the step of selecting the Server according to the Client Internet Protocol (IP) address.

13. The method according to claim 1 wherein the step of measuring the performance and availability further comprises the steps of:

comparing the measured response time for each server with response times previously measured; and determining for each server a degradation of the measured response time.

14. The method according to claim 1 wherein the step of measuring the performance and availability further comprises the steps of:

detecting failures on each server; and excluding servers in failure from consideration in the step of dynamically selecting a server.

15. The method according to claim 14 wherein the step of detecting a failure on a server comprises the steps of:

comparing the measured response time with a given threshold; and when said measured response time exceeds said given threshold, flagging the server as being in failure.

16. The method according to claim 14 wherein the step of selecting a server according to performance and availability measurements further comprises the step of selecting the Server according to the Client Internet Protocol (IP) address.

17. The method according to claim 1 further comprising the steps of
processing performance and availability measurements from a single intermediate selection application uniform resource locator (URL) system; and
dynamically creating a Selection Screen on said intermediate selection application uniform resource locator (URL) system based on the performance and availability measurements.

18. The method according to claim 17 wherein the Selection Screen is written in HTML language.

19. The method according to claim 17 wherein the step of dynamically creating a Selection Screen is processed by a common gateway interface (CGI) on said intermediate selection application uniform resource locator (URL) system.

20. The method according to claim 19 wherein the step of selecting a server further comprises the step of downloading the Selection Screen from the intermediate selection application uniform resource locator (URL) system to the web client.

21. The method according to claim 19 wherein the Selection Screen is dynamically created and downloaded each time the end user connects to the intermediate selection application uniform resource locator (URL) system.

22. The method according to claim 17 wherein the Selection Screen is dynamically created and downloaded each time the end user connects to the intermediate selection application uniform resource locator (URL) system.

23. The method according to claim 17 wherein the step of selecting a server according to performance and availability measurements further comprises the step of selecting the Server according to the Client Internet Protocol (IP) address.

24. The method according to claim 1 wherein the step of selecting a server further comprises the step of downloading the Selection Screen from the intermediate selection application uniform resource locator (URL) system to the web client.

25. The method according to claim 1 wherein the step of selecting a server according to performance and availability measurements further comprises the step of selecting the Server according to the Client Internet Protocol (IP) address.

26. A system for dynamically selecting a Server for accessing Systems Network Architecture (SNA) Applications from a Client, in an Internet Protocol (IP) network comprising:
means for measuring performance and availability of each Server for accessing one or a plurality of SNA Applications using measurement probes; and
means for dynamically selecting a Server for accessing a particular SNA Application using the performance and availability measurements.

27. The system according to claim 26 wherein:
the Server is a TN3270 Server; and
the Client is a TN 3270 Client.

28. The system according to claim 26 wherein the means for measuring the performance and availability comprises means for measuring the response time required to retrieve information from each SNA Application through each Server.

29. The system according to claim 28 wherein the information retrieved is a Welcome Screen.

30. The system according to claim 28 wherein the means for measuring the response time comprises:
means for establishing a connection with the SNA Application through the Server;
means for retrieving the information from the SNA Application; and
means for checking that the retrieved information contains one or a plurality of known keywords.

31. The system according to claim 30 wherein the means for measuring the performance and availability further comprises:
means for comparing the measured response time for each server with response times previously measured; and
means for determining for each server a degradation of the measured response time.

32. The system according to claim 30 wherein the means for measuring the performance and availability further comprises:
means for detecting failures on each server; and
means for excluding servers in failure from consideration in the means for dynamically selecting a server.

33. The system according to claim 32 wherein the means for detecting a failure on a server comprises:
means for comparing the measured response time with a given threshold; and
means for flagging the server as being in failure when said measured response time exceeds said given threshold.

34. The system according to claim 30 wherein the means for selecting a server according to performance and availability measurements further comprises means for selecting the Server according to the Client Internet Protocol (IP) address.

35. The system according to claim 28 wherein the means for measuring the performance and availability further comprises:
means for detecting failures on each server; and
means for excluding servers in failure from consideration in the step of dynamically selecting a server.

36. The system according to claim 35 wherein the means for detecting a failure on a server comprises:
means for comparing the measured response time with a given threshold; and
means for flagging the server as being in failure when the measured response time exceeds said given threshold.

37. The system according to claim 28 wherein the means for selecting a server according to performance and availability measurements further comprises means for selecting the Server according to the Client Internet Protocol (IP) address.

38. The system according to claim 26 wherein the means for measuring the performance and availability further comprises:
means for comparing the measured response time for each server with response times previously measured; and
means for determining for each server a degradation of the measured response time.

39. The system according to claim 26 wherein the means for measuring the performance and availability further comprises:
means for detecting failures on each server; and
means for excluding servers in failure from consideration in the means for dynamically selecting a server.

40. The system according to claim 39 wherein the means for detecting a failure on a server comprises:
  means for comparing the measured response time with a given threshold; and
  means for flagging the server as being in failure when the measured response time exceeds said given threshold.

41. The system according to claim 39 wherein the means for selecting a server according to performance and availability measurements further comprises means for selecting the Server according to the Client Internet Protocol (IP) address.

42. The system according to claim 26 further comprising:
  means for processing performance and availability measurements from a single intermediate selection application uniform resource locator (URL) system; and
  means for dynamically creating a Selection Screen on said intermediate selection application uniform resource locator (URL) system based on the performance and availability measurements.

43. The system according to claim 42 wherein the Selection Screen is written in HTML language.

44. The system according claim 42 wherein the means for dynamically creating a Selection Screen is processed by a common gateway interface (CGI) on said intermediate selection application uniform resource locator (URL) system.

45. The system according to claim 44 wherein the means for selecting a server further comprises means for downloading the Selection Screen from the intermediate selection application uniform resource locator (URL) system to the web client.

46. The system according to claim 44 wherein the Selection Screen is dynamically created and downloaded each time the end user connects to the intermediate selection application uniform resource locator (URL) system.

47. The system according to claim 42 wherein the Selection Screen is dynamically created and downloaded each time the end user connects to the intermediate selection application uniform resource locator (URL) system.

48. The system according to claim 42 wherein the means for selecting a server according to performance and availability measurements further comprises means for selecting the Server according to the Client Internet Protocol (IP) address.

49. The system according to claim 26 wherein the means for selecting a server further comprises means for downloading the Selection Screen from the intermediate selection application uniform resource locator (URL) system to the web client.

50. The system according to claim 26 wherein the means for selecting a server according to performance and availability measurements further comprises means for selecting the Server according to the Client Internet Protocol (IP) address.

51. A computer-readable medium having thereon instructions for dynamically selecting a Server for accessing Systems Network Architecture (SNA) Applications from a Client, in an Internet Protocol (IP) network, said instructions comprising:
  instructions for measuring performance and availability of each Server for accessing one or a plurality of SNA Applications using measurement probes; and
  instructions for dynamically selecting a Server for accessing a particular SNA Application using the performance and availability measurements.

52. The computer-readable medium according to claim 51 wherein:
  the Server is a TN3270 Server; and
  the Client is a TN 3270 Client.

53. The computer-readable medium according to claim 51 wherein the instructions for measuring the performance and availability comprise instructions for measuring the response time required to retrieve information from each SNA Application through each Server.

54. The computer-readable medium according to claim 53 wherein the information retrieved is a Welcome Screen.

55. The computer-readable medium according to claim 53 wherein the instructions for measuring the response time comprise:
  instructions for establishing a connection with the SNA Application through the Server;
  instructions for retrieving the information from the SNA Application; and
  instructions for checking that the retrieved information contains one or a plurality of known keywords.

56. The computer-readable medium according to claim 55 wherein the instructions for measuring the performance and availability further comprise:
  instructions for comparing the measured response time for each server with response times previously measured; and
  instructions for determining for each server a degradation of the measured response time.

57. The computer-readable medium according to claim 55 wherein the instructions for measuring the performance and availability further comprise:
  instructions for detecting failures on each server; and
  instructions for excluding servers in failure from consideration in the instructions for dynamically selecting a server.

58. The computer-readable medium according to claim 57 wherein the instructions for detecting a failure on a server comprise:
  instructions for comparing the measured response time with a given threshold; and
  instructions for flagging the server as being in failure when said measured response time exceeds said given threshold.

59. The computer-readable medium according to claim 55 wherein the instructions for selecting a server according to performance and availability measurements further comprise instructions for selecting the Server according to the Client Internet Protocol (IP) address.

60. The computer-readable medium according to claim 53 wherein the instructions for measuring the performance and availability further comprise:
  instructions for detecting failures on each server; and
  instructions for excluding servers in failure from consideration in the step of dynamically selecting a server.

61. The computer-readable medium according to claim 60 wherein the instructions for detecting a failure on a server comprise:
  instructions for comparing the measured response time with a given threshold; and
  instructions for flagging the server as being in failure when the measured response time exceeds said given threshold.

62. The computer-readable medium according to claim 53 wherein the instructions for selecting a server according to performance and availability measurements further comprise instructions for selecting the Server according to the Client Internet Protocol (IP) address.

63. The computer-readable medium according to claim 51 wherein the instructions for measuring the performance and availability further comprise:

instructions for comparing the measured response time for each server with response times previously measured; and instructions for determining for each server a degradation of the measured response time.

64. The computer-readable medium according to claim 51 wherein the instructions for measuring the performance and availability further comprise:

instructions for detecting failures on each server; and instructions for excluding servers in failure from consideration in the instructions for dynamically selecting a server.

65. The computer-readable medium according to claim 64 wherein the instructions for detecting a failure on a server comprise:

instructions for comparing the measured response time with a given threshold; and instructions for flagging the server as being in failure when the measured response time exceeds said given threshold.

66. The computer-readable medium according to claim 64 wherein the instructions for selecting a server according to performance and availability measurements further comprise instructions for selecting the Server according to the Client Internet Protocol (IP) address.

67. The computer-readable medium according to claim 51 further comprising:

instructions for processing performance and availability measurements from a single intermediate selection application uniform resource locator (URL) system; and instructions for dynamically creating a Selection Screen on said intermediate selection application uniform resource locator (URL) system based on the performance and availability measurements.

68. The computer-readable medium according to claim 67 wherein the Selection Screen is written in HTML language.

69. The computer-readable medium according claim 67 wherein the instructions for dynamically creating a Selection Screen are processed by a common gateway interface (CGI) on said intermediate selection application uniform resource locator (URL) system.

70. The computer-readable medium according to claim 69 wherein the instructions for selecting a server further comprise instructions for downloading the Selection Screen from the intermediate selection application uniform resource locator (URL) system to the web client.

71. The computer-readable medium according to claim 69 wherein the Selection Screen is dynamically created and downloaded each time the end user connects to the intermediate selection application uniform resource locator (URL) system.

72. The computer-readable medium according to claim 67 wherein the Selection Screen is dynamically created and downloaded each time the end user connects to the intermediate selection application uniform resource locator (URL) system.

73. The computer-readable medium according to claim 67 wherein the instructions for selecting a server according to performance and availability measurements further comprise instructions for selecting the Server according to the Client Internet Protocol (IP) address.

74. The computer-readable medium according to claim 51 wherein the instructions for selecting a server further comprise instructions for downloading the Selection Screen from the intermediate selection application uniform resource locator (URL) system to the web client.

75. The computer-readable medium according to claim 51 wherein the instructions for selecting a server according to performance and availability measurements further comprise instructions for selecting the Server according to the Client Internet Protocol (IP) address.

* * * * *